United States Patent
Van Hinsbergh

(10) Patent No.: US 11,418,016 B2
(45) Date of Patent: Aug. 16, 2022

(54) PULL-IN HEAD ASSEMBLY

(71) Applicant: C-Ling Limited, Gloucester (GB)

(72) Inventor: Gregory Van Hinsbergh, Gloucester (GB)

(73) Assignee: C-LING LIMITED, Gloucester (GB)

(*) Notice: Subject to any disclaimer, the term of this patent is extended or adjusted under 35 U.S.C. 154(b) by 255 days.

(21) Appl. No.: 16/625,444

(22) PCT Filed: Jun. 15, 2018

(86) PCT No.: PCT/GB2018/051666
§ 371 (c)(1),
(2) Date: Dec. 20, 2019

(87) PCT Pub. No.: WO2018/234763
PCT Pub. Date: Dec. 27, 2018

(65) Prior Publication Data
US 2020/0412112 A1 Dec. 31, 2020

(30) Foreign Application Priority Data
Jun. 21, 2017 (GB) ...................................... 1709938

(51) Int. Cl.
*H02G 1/10* (2006.01)
*F03D 80/80* (2016.01)
(Continued)

(52) U.S. Cl.
CPC ............... *H02G 1/10* (2013.01); *F03D 80/85* (2016.05); *H02G 1/081* (2013.01); *E02B 2017/0095* (2013.01); *H02G 3/22* (2013.01)

(58) Field of Classification Search
CPC ............. E02B 2017/0095; E21B 17/02; E21B 17/021; E21B 17/03; E21B 17/046;
(Continued)

(56) References Cited

U.S. PATENT DOCUMENTS 2,766,501 A 10/1956 Kellems
3,137,765 A 6/1964 Lanum
(Continued)

FOREIGN PATENT DOCUMENTS

DE 202004020720 1/2006
DE 202009006507 8/2009
(Continued)

OTHER PUBLICATIONS

Official Action with English Translation for Japan Patent Application No. 2019-570967, dated Mar. 22, 2022, 8 pages.

*Primary Examiner* — Tyrone V Hall, Jr.
(74) *Attorney, Agent, or Firm* — Sheridan Ross P.C.

(57) ABSTRACT

A pull-in head assembly (8) for releasably connecting a pulling arrangement (112) to an elongate flexible structure (4, 6). The pull-in head assembly (8) comprises a body (30) which defines a pulling axis X of the pull-in head and a retaining member (32) which is configured to secure the pull-in head assembly (8) to an elongate flexible structure (4, 6) such that a pulling force exerted on the body (30) along the pulling axis X is transferred to the elongate flexible structure (4, 6). The pull-in head assembly (8) is configured such that, in use, the body (30) and the elongate flexible structure (4, 6) are rotatable with respect to each other about the pulling axis X.

18 Claims, 11 Drawing Sheets

(51) Int. Cl.
*H02G 1/08* (2006.01)
*E02B 17/00* (2006.01)
*H02G 3/22* (2006.01)

(58) Field of Classification Search
CPC ....... E21B 17/0465; F03D 80/85; H02G 1/00; H02G 1/08; H02G 1/081; H02G 1/088; H02G 1/10
See application file for complete search history.

(56) References Cited

U.S. PATENT DOCUMENTS

| | | | |
|---|---|---|---|
| 4,453,219 A | 6/1984 | Clavier et al. | |
| 4,453,291 A | 6/1984 | Fidrych | |
| 4,684,161 A | 8/1987 | Egner et al. | |
| 5,122,007 A | 6/1992 | Smith | |
| 6,537,118 B2 | 3/2003 | McAlpine | |
| 6,755,595 B2 | 6/2004 | Oram | |
| 6,821,055 B2 | 11/2004 | Oram | |
| 7,100,641 B2 | 9/2006 | Tyrer et al. | |
| 7,749,035 B2 | 7/2010 | Oram et al. | |
| 8,033,302 B2 | 10/2011 | Standal et al. | |
| 8,596,912 B2 * | 12/2013 | Routeau | E21B 43/0107 405/168.1 |
| 9,190,820 B2 | 11/2015 | Nurmi et al. | |
| 9,249,899 B2 | 2/2016 | Bang-Andreasen | |
| 9,864,381 B2 | 1/2018 | Carlson et al. | |
| 10,199,808 B2 | 2/2019 | Bang-Andreasen | |
| 2007/0051419 A1 | 3/2007 | Walsh | |
| 2008/0245933 A1 | 10/2008 | Stokes | |
| 2008/0251668 A1 | 10/2008 | Stokes | |
| 2009/0126819 A1 | 5/2009 | Beesley | |
| 2009/0224220 A1 | 9/2009 | Jordan et al. | |
| 2009/0272855 A1 | 11/2009 | Oram | |
| 2011/0226527 A1 | 9/2011 | Ritchie-Bland | |
| 2012/0282035 A1 | 11/2012 | Ebert | |
| 2013/0221298 A1 | 8/2013 | Bennett et al. | |
| 2015/0064477 A1 | 3/2015 | Oram et al. | |
| 2016/0002874 A1 | 1/2016 | Schultes | |
| 2017/0279258 A1 | 9/2017 | Meseti | |
| 2018/0198264 A1 | 7/2018 | Bang-Andreasen | |
| 2019/0181623 A1 | 6/2019 | Andreasen | |
| 2019/0186208 A1 | 6/2019 | Noble et al. | |
| 2019/0214801 A1 | 7/2019 | Smith et al. | |
| 2019/0229505 A1 | 7/2019 | Bang-Andreasen | |

FOREIGN PATENT DOCUMENTS

| | | |
|---|---|---|
| DE | 202010002679 | 6/2010 |
| DE | 202012102174 | 10/2012 |
| DK | 201170676 | 6/2013 |
| EP | 1586922 | 10/2005 |
| EP | 1850044 | 10/2007 |
| EP | 1985845 | 10/2008 |
| EP | 2261080 | 12/2010 |
| EP | 2279979 | 2/2011 |
| EP | 2302211 | 3/2011 |
| EP | 2361752 | 8/2011 |
| EP | 2897233 | 7/2015 |
| EP | 3338879 | 6/2018 |
| EP | 3410550 | 12/2018 |
| FI | 125437 | 10/2015 |
| FR | 2725845 | 4/1996 |
| GB | 2205695 | 12/1988 |
| GB | 2349414 | 11/2000 |
| GB | 2358691 | 8/2001 |
| GB | 2365941 | 2/2002 |
| GB | 2378969 | 2/2003 |
| GB | 2391255 | 2/2004 |
| GB | 2499683 | 8/2013 |
| GB | 2520837 | 6/2015 |
| GB | 2521922 | 7/2015 |
| GB | 2526567 | 12/2015 |
| GB | 201715211 | 11/2017 |
| JP | S55-95414 | 7/1980 |
| JP | S57-21212 | 2/1982 |
| JP | H03-112310 | 5/1991 |
| JP | 2006-180636 | 7/2006 |
| TW | 200943659 | 10/2009 |
| TW | 201622282 | 6/2016 |
| WO | WO 93/17476 | 9/1993 |
| WO | WO 94/05929 | 3/1994 |
| WO | WO 97/42531 | 11/1997 |
| WO | WO 02/08139 | 1/2002 |
| WO | WO 03/106877 | 12/2003 |
| WO | WO 2005/095198 | 10/2005 |
| WO | WO 2006/024244 | 3/2006 |
| WO | WO 2008/139190 | 11/2008 |
| WO | WO 2010/139725 | 12/2010 |
| WO | WO 2011/131918 | 10/2011 |
| WO | WO 2011/141494 | 11/2011 |
| WO | WO 2012/072063 | 6/2012 |
| WO | WO 2013/083802 | 6/2013 |
| WO | WO 2015/071679 | 5/2015 |
| WO | WO 2015/071680 | 5/2015 |
| WO | WO 2017/093725 | 6/2017 |
| WO | WO 2017/191474 | 11/2017 |
| WO | WO 2017/194067 | 11/2017 |
| WO | WO 2017/211810 | 12/2017 |
| WO | WO 2017/211815 | 12/2017 |
| WO | WO 2017/216298 | 12/2017 |
| WO | WO 2018/033703 | 2/2018 |
| WO | WO 2018/060004 | 4/2018 |
| WO | WO 2018/095643 | 5/2018 |
| WO | WO 2018/115056 | 6/2018 |
| WO | WO 2018/115176 | 6/2018 |
| WO | WO 2018/162573 | 9/2018 |
| WO | WO 2019/025316 | 2/2019 |
| WO | WO 2019/030541 | 2/2019 |
| WO | WO 2019/043412 | 3/2019 |
| WO | WO 2019/058093 | 3/2019 |
| WO | WO 2019/073088 | 4/2019 |
| WO | WO 2019/077370 | 4/2019 |
| WO | WO 2019/116014 | 6/2019 |

* cited by examiner

PULL-IN HEAD ASSEMBLY

CROSS REFERENCE TO RELATED APPLICATIONS

This application is a national stage application under 35 U.S.C. 371 and claims the benefit of PCT Application No. PCT/GB2018/051666 having an international filing date of 15 Jun. 2018, which designated the United States, which PCT application claimed the benefit of United Kingdom Patent Application No. 1709938.3 filed Jun. 21, 2017, the disclosures of each of which are incorporated herein by reference in their entireties.

This invention relates to a pull-in head assembly, apparatus, a method of installing an elongate flexible structure and particularly, but not exclusively, relates to a pull-in head assembly and installation method for a cable protection system.

Cables and other flexible products whether on land, in the dry, or in fresh/brackish water or subsea environments have been installed into infrastructure for many years using simple, reliable equipment.

Due to the mass of the power cables, which can be 10 kg/m to over 150 kg/m, the co-efficient of friction and installation geometries, the winching cable tension required to deploy or install them from a vessel or barge or trailer may well fluctuate from 1 kN to over 150 kN (15 tonnes) depending on the capability of the infrastructure winching system and/or vessel hold back winch/cable engine.

The tension in the winching cable can instantaneously increase (spike) due to high levels of axial stiffness within the cable. An abrupt increase in tension may also occur if any of the fasteners used to secure a winching cable to the cable (e.g. ferrules, links, stockings, couplings) makes contact, is constrained against (i.e. snags) or geometrically locks with (including friction effects) any external or internal abutment.

Any large tension spike can lead to the damage of the relatively expensive cable. If the system is being installed subsea, any delay in operations to investigate causes of snagging and any rectification to fix damaged equipment or assets can lead to costly and time-consuming activities.

In recent years, it has been recognised that cables are most liable to damage, and a consequent large insurance claim, during the installation phase.

To protect cables during the installation phase, but also throughout their service-life, Cable Protection Systems (CPS) have been developed. Cable Protection Systems typically comprise a flexible protective sleeve that extends along the outside of the cable to protect the cable from damage during installation and subsequent use. Cable Protection Systems may have several functions including preventing the minimum bend radius of a cable from being compromised, preventing excessive tension being applied to a cable and/or protecting a cable from scour once installed. However, by the inclusion of such a system temporarily or permanently near or onto the cable end or at a constraining feature located along the length of the cable, such as a centraliser—when fitted inside a J-tube—the installation can become problematic.

Historically, two winching cables (typically known as messenger lines) are used to install a cable and a Cable Protection System. One winching cable is connected to the cable and the other connected to the Cable Protection System.

In this instance, the Cable Protection System and the cable are pulled together into a structural interface, which has latches or latching features, to constrain the Cable Protection System to the support structure.

After the Cable Protection System has been confirmed as being constrained using the first winching cable, the second winching cable is used to pull the cable up to a hang-off within the support structure.

Both the cable and the Cable Protection System are prone to rotation during installation, as they are not rotationally constrained and manufacturing stresses or pre-cable coiling processes, such as winding the cable into a carousel, can cause torque wind-up, which tends to equalise itself with connected assemblies as the cable is deployed in one continuous length from the vessel and pulled into the foundation under tension. The winch wire can also induce additional wind-up due to its spiral configuration. Low rotational ropes, with counter spiral layers, attempt to mitigate this issue with minimal torque being developed under tension.

Winching cables are therefore prone to become entangled with one another which leads to costly delays or even system removal for a repeat attempt to rectify the predicament.

Furthermore, this can lead to the Cable Protection System being installed at any orientation angle.

Although this does not affect the ability to install the Cable Protection System into the Structural interface it does mean that due to the offset arrangement the required Cable Protection System pull in force is unpredictable; as it is related, amongst other factors, to the installation orientation and departure angles.

In alternative arrangements, a single winching cable may be used which is connected via a weak link to the Cable Protection System and is also connected to the cable such that, once the Cable Protection System is installed, the weak link fails allowing the cable to be subsequently drawn into position.

A further problem associated with known installation equipment is snagging of the connectors between the winching cables and the pull-in heads on undersea structures and on the structure itself during installation.

It is an aim of the present invention to at least partly mitigate the above-mentioned problems.

It is an aim of certain embodiments of the invention to provide an improved pull-in head assembly in which minimises the risk of twisting and/or tangling of a winching cable attached to the pulling head during use.

According to a first aspect of the present invention there is provided a pull-in head assembly for releasably connecting a pulling arrangement to an elongate flexible structure, comprising:

a body which defines a pulling axis of the pull-in head; and a retaining member which is configured to secure the pull-in head assembly to an elongate flexible structure such that a pulling force exerted on the body along the pulling axis is transferred to the elongate flexible structure, wherein the pull-in head assembly is configured such that, in use, the body and the elongate flexible structure are rotatable with respect to each other about the pulling axis.

The retaining member may have at least one retaining feature which is configured to engage with a corresponding retaining groove provided on the elongate flexible structure such that the retaining feature can slide within the groove. The retaining member may be annular.

The retaining member may have a substantially conical outer profile.

The retaining member may converge towards a front of the pull-in head assembly along the pulling axis.

At least a portion of the pull-in head assembly comprising the retaining member may be configured for insertion into an open end of the elongate flexible structure.

The portion of the pull-in head assembly comprising the retaining member may be configured for insertion into an end of a connector for a cable protection system.

The retaining member may be configured to releasably secure the pulling head assembly to the elongate flexible structure.

The pulling head assembly may be configured such that the elongate flexible structure rotates with respect to the body about the pulling axis when a torque within a predetermined range is applied to the elongate flexible structure. The predetermined range may be a torque between 1 kN and 100 kNm, for example a torque between 1 kN and 10 kN.

The retaining member may have a bearing surface which engages with the elongate flexible structure, wherein the bearing surface has a coefficient of friction which is less than 2. The bearing surface may have a coefficient of friction which is less than 1, for example less than 0.5. The bearing surface may comprise a polymer such as rubber or polyurethane having a Shore hardness between Shore 60A and Shore 60D.

According to a second aspect of the invention there is provided apparatus comprising: a pull-in head assembly in accordance with any one of the preceding claims; and an elongate flexible structure comprising an elongate flexible element and a connector for connecting the elongate flexible element to a support structure, wherein the pull-in head is secured to the connector.

The connector may comprise a retaining feature which is configured to engage the retaining member in order to secure the pull-in head assembly to the elongate flexible structure.

The connector may have a bore which extends along the longitudinal axis of the connector for receiving at least a portion of the pull-in head assembly comprising the retaining member.

The retaining feature may comprise at least one annular groove provided in a surface of the bore.

The annular groove may have a profile which corresponds to an outer profile of the retaining member such that the retaining member engages with the annular groove to secure the pull-in head assembly to the elongate flexible structure.

The groove may have a V-shaped profile when viewed in a circumferential direction.

The retaining member may be configured to releasably secure the pulling head assembly to the elongate flexible structure.

The apparatus may further comprises a second elongate flexible structure which extends within the elongate flexible structure. The second elongate flexible structure may be secured to the body such that, following release of the pull-in head assembly from the elongate flexible structure, the second elongate flexible structure remains connected to the pull-in head assembly as the pull-in head assembly is separated from the elongate flexible structure.

According to a third aspect of the invention there is provided a method of installing an elongate flexible structure comprising the steps:

a. providing the pull-in head assembly of the first aspect of the invention;
b. securing the pull-in head assembly to an elongate flexible structure; and
pulling the pull-in head assembly together with the elongate flexible structure into a desired location.

In the context of the present invention, a pull-in head (which is also sometimes referred to as a pulling head) is a device that is used to temporarily couple a pulling arrangement, such as, but not limited to, a winching system, to the end of an elongate flexible structure, such as, but not limited to, an end fitting for a pipe, tube or a cable, so that the elongate flexible structure can be pulled (e.g. winched) along a surface, trench, bore or along the side or within a structure, or even lifted, into a desired position, such as, but not limited to, into engagement with a connector or fastener provided on a support structure.

A pull-in head typically includes a body portion which, in the case of pulling heads used to install a tubular elongate flexible structure, can be inserted into the end of the end of the tubular elongate flexible structure and secured using a fastener to the end of the tubular elongate flexible structure.

A common characteristic of pull-in heads is that they are removed from an elongate flexible structure once installation of the elongate flexible structure is complete.

Certain embodiments of the present invention provide means for inhibiting transfer of torque generated by, or on, an elongate flexible structure during installation to a pulling line and/or cable secured to a pulling head during installation of the elongate flexible structure.

Certain embodiments of the present invention provide a pull-in head arrangement which allows an end fitting of an elongate flexible structure secured to the pull-in head to rotate with respect to the pull-in head when a torque is applied to the end fitting about the pulling axis of the pull-in head.

Certain embodiments of the invention may be used for connection of an elongate flexible structure, such as a Cable Protection System, flexible subsea pipe or umbilical, to a marine support structure such as, but not limited to, a monopile for a wind turbine or a J-tube bellmouth.

Certain embodiments of the invention help alleviate twisting of a winching cable during installation of an elongate flexible structure such as a Cable Protection System or a cable.

Certain embodiments of the invention to provide an improved pull-in head assembly and/or apparatus for installing a cable and a cable protection system contemporaneously.

Embodiments of the present invention will now be described, by way of example, with reference to the accompanying drawings in which.

Figure 7A:
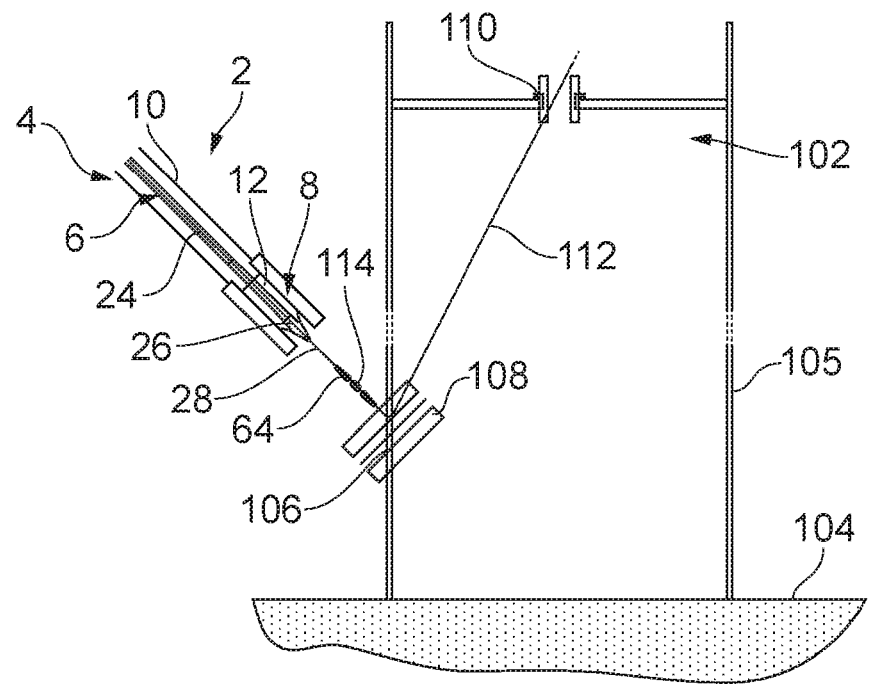
Figure 7B:
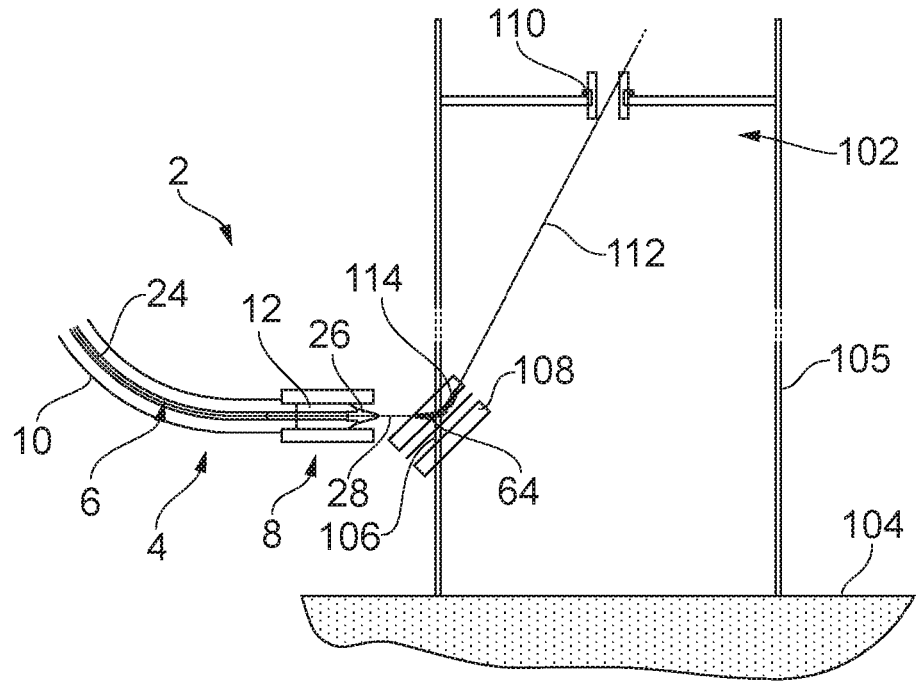
Figure 7C:
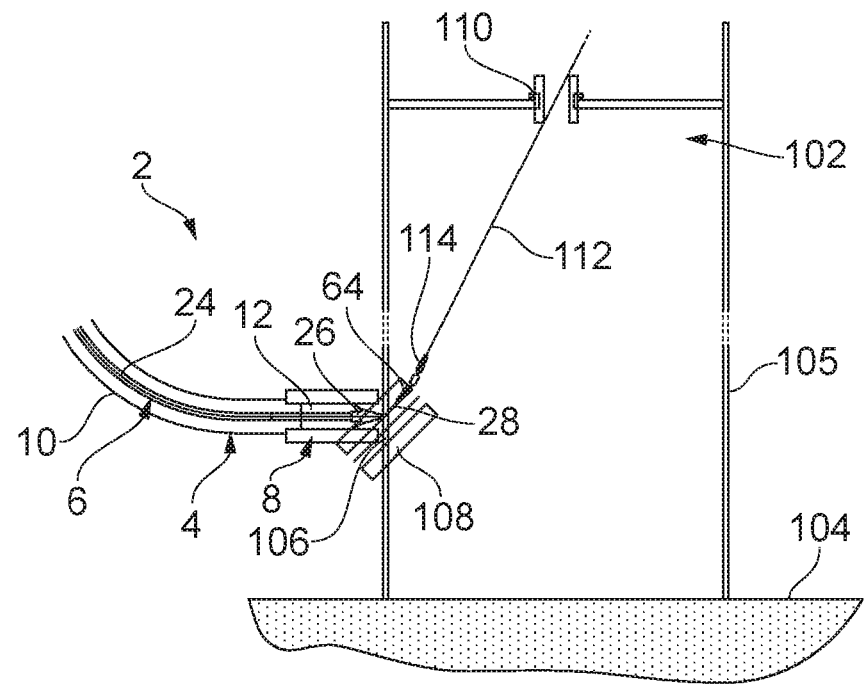
Figure 7D:
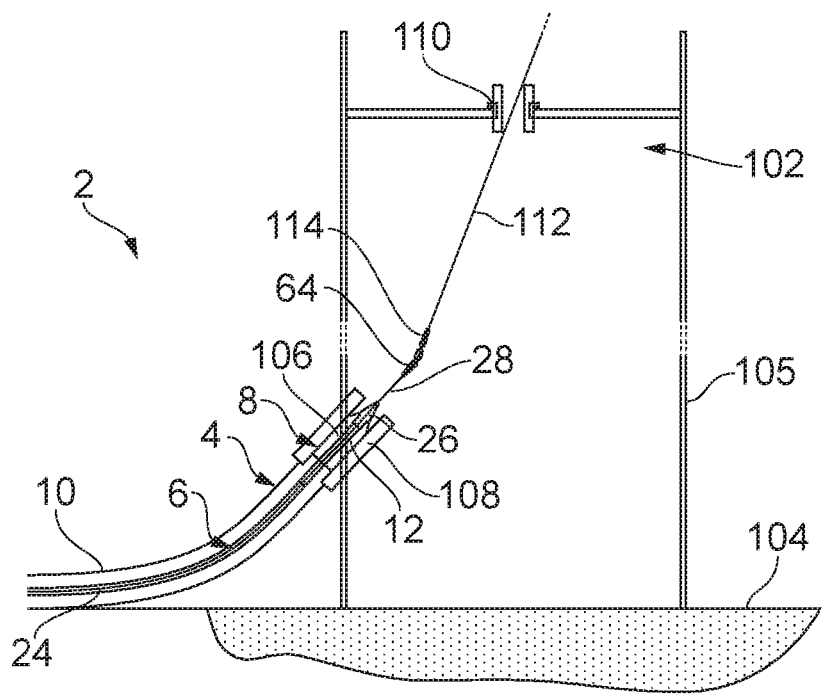
Figure 7E:
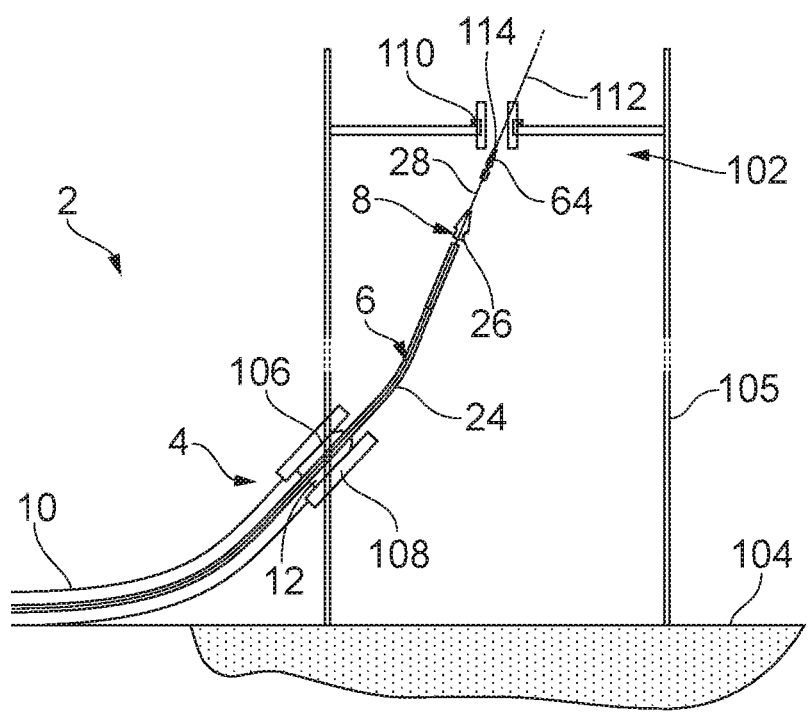
Figure 8:
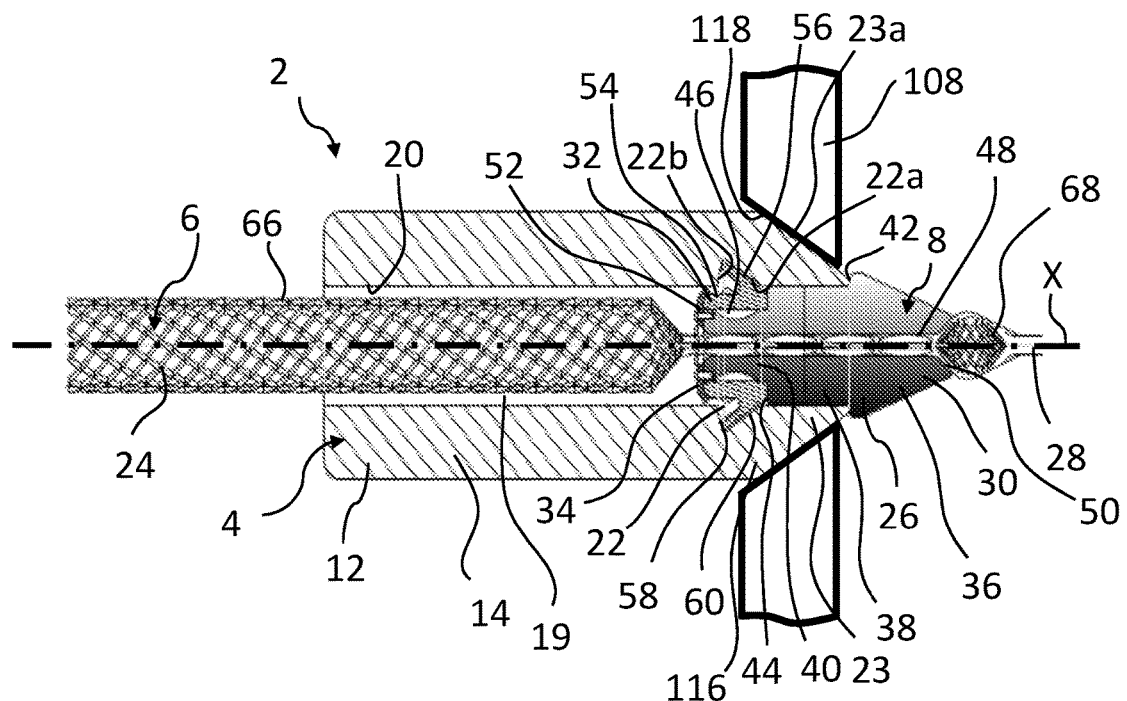
Figure 9:
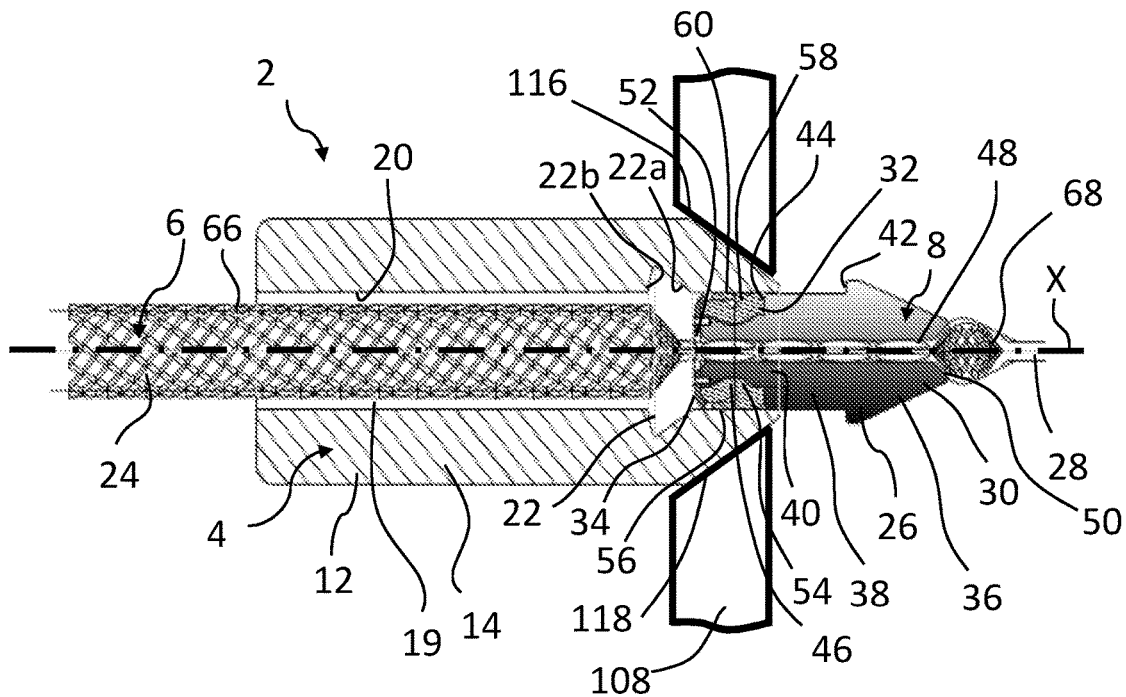
Figure 10:
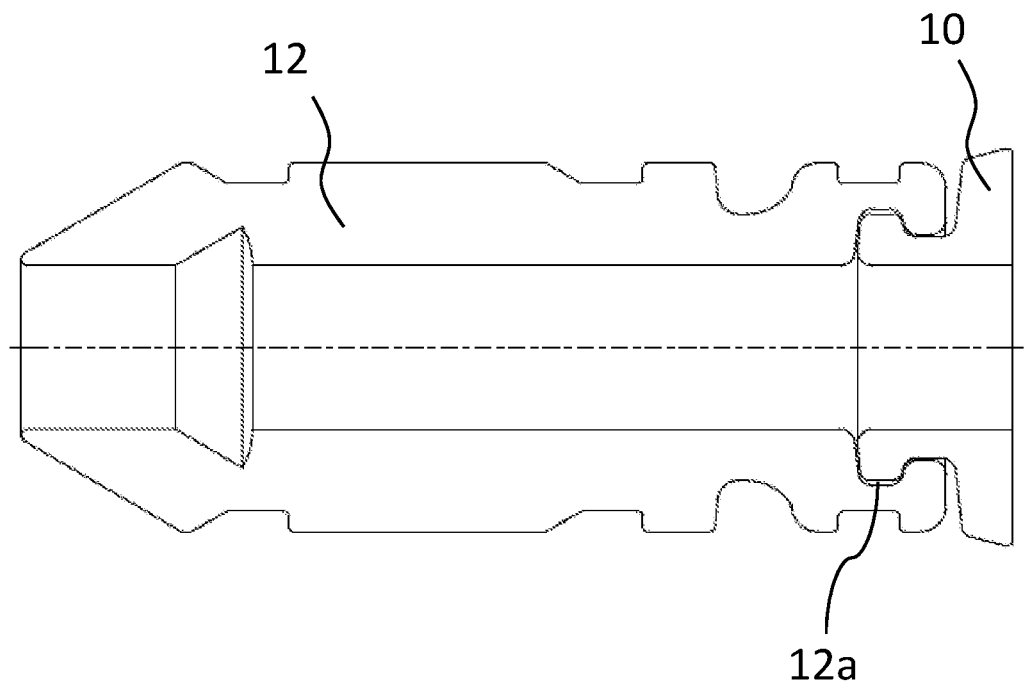
Figure 11:
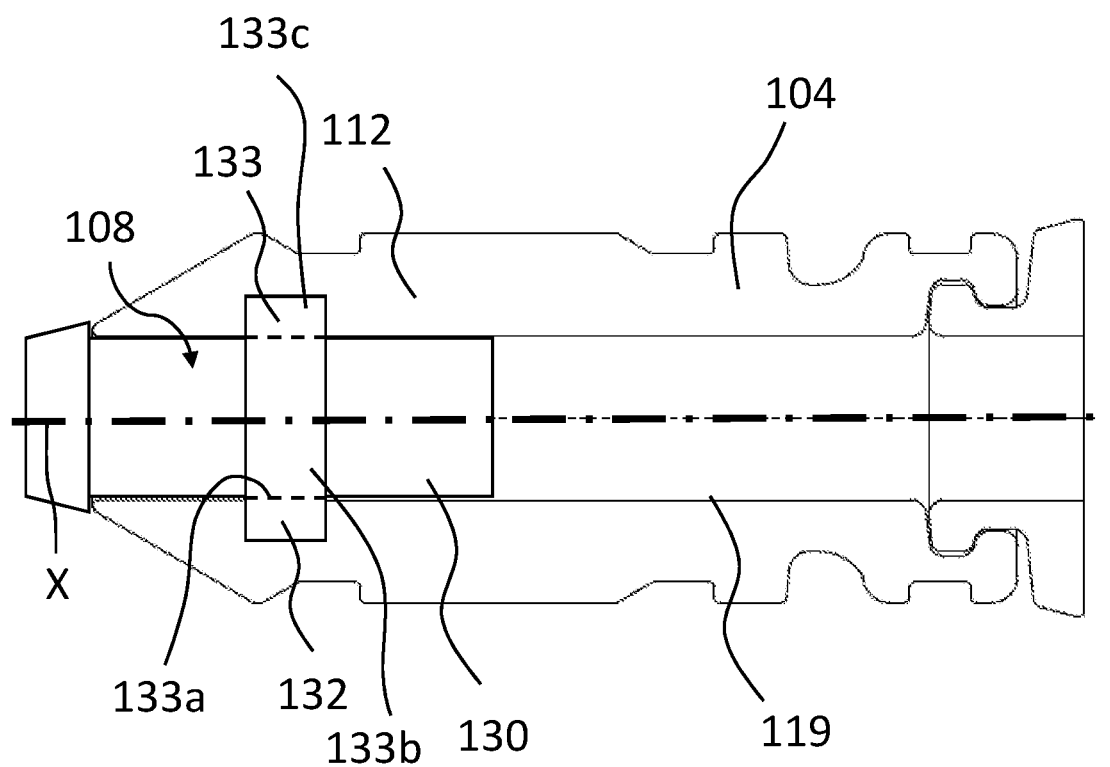

FIG. 7A shows a step of an installation process;
FIG. 7B shows a further step of an installation process;
FIG. 7C shows a further step of an installation process;
FIG. 7D shows a further step of an installation process;
FIG. 7E shows a further step of an installation process;
FIG. 8 is sectional view illustrating a transition step of the installation process shown in FIGS. 7A to 7E;
FIG. 9 is sectional view illustrating a further transition step of the installation process shown in FIGS. 7A to 7E;
FIG. 10 shows illustrates connection between a connector and an elongate flexible sleeve; and FIG. 11 is a schematic representation of a further apparatus comprising a pull-in head assembly.

Figure 1:
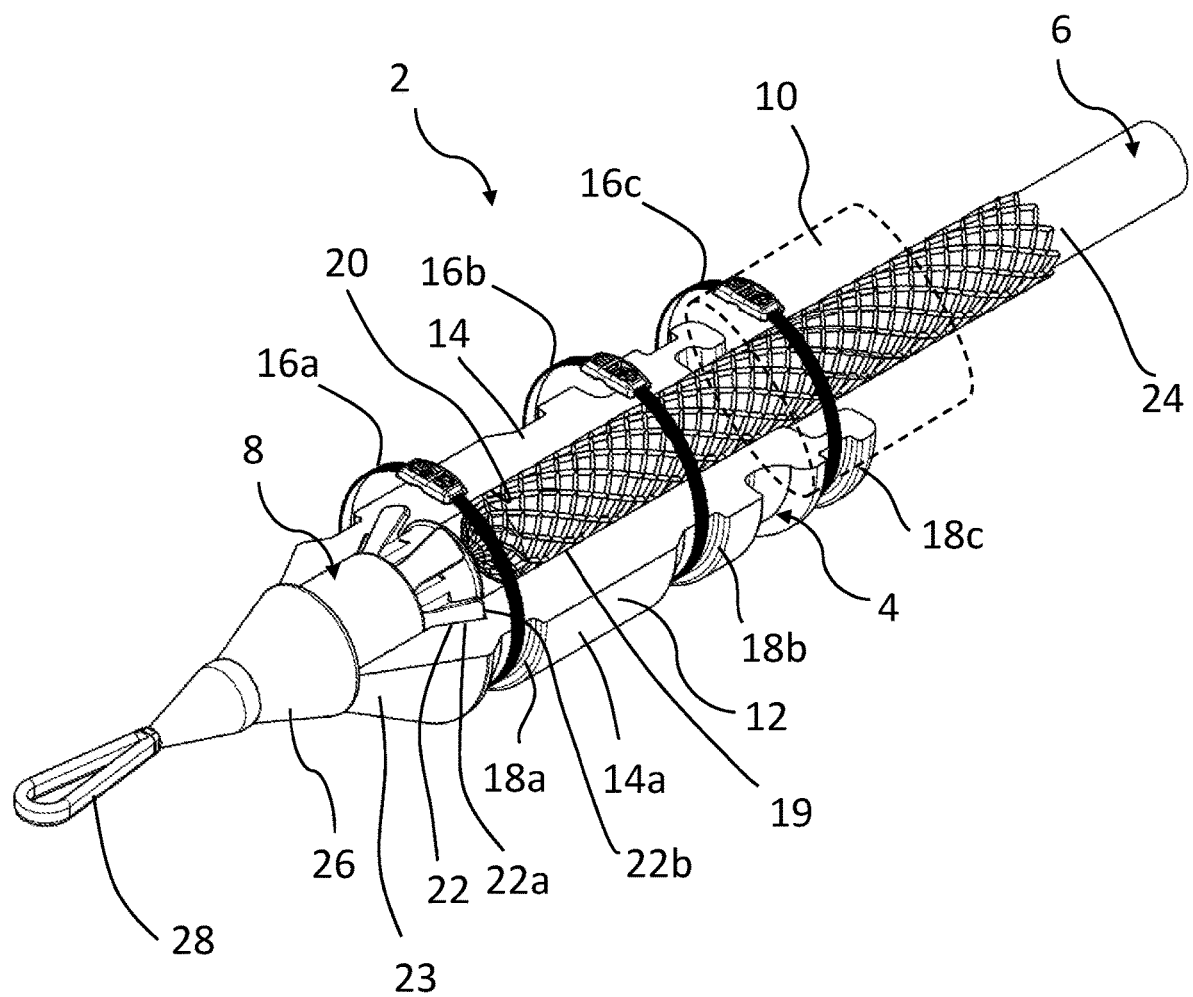
FIG. 1 shows some components of an apparatus comprising a pull-in head assembly.
Figure 2:
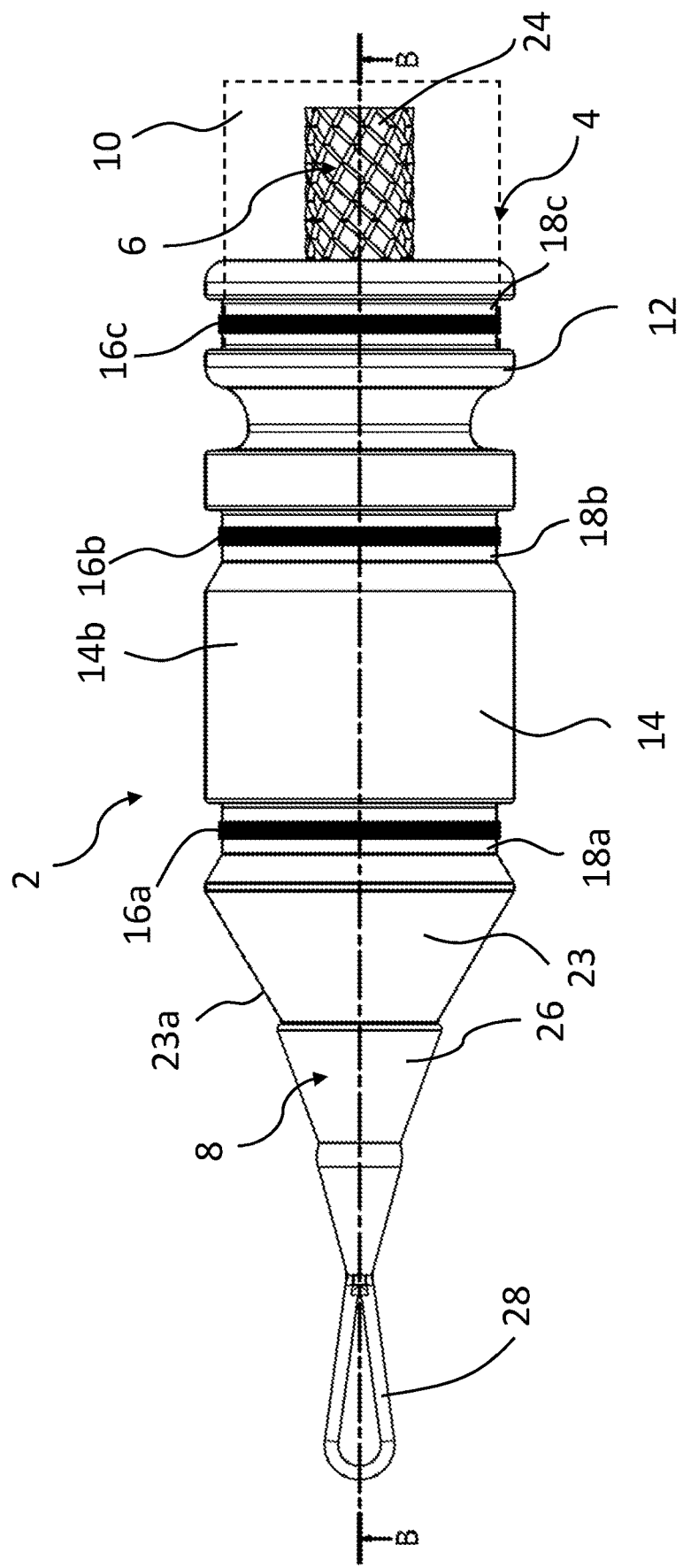
FIG. 2 is a bottom view of a portion of the apparatus shown in FIG. 1.
Figure 3:
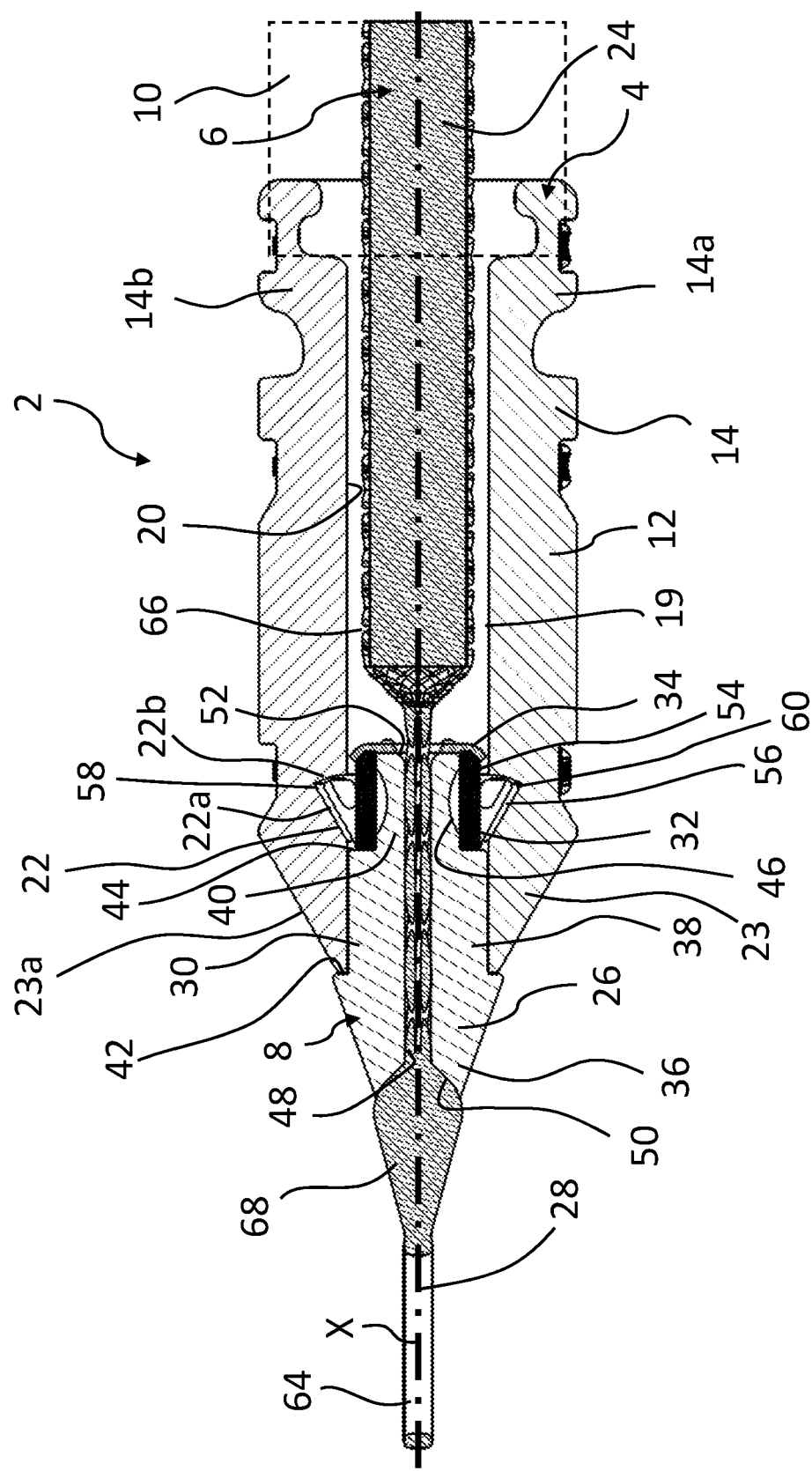
FIG. 3 is a sectional view along line B-B of FIG. 2.

FIGS. 1 to 3 show part of an apparatus 2 comprising a first elongate flexible structure 4, a second elongate flexible structure 6 and a pull-in head assembly 8.

The first elongate flexible structure 4 comprises an elongate flexible element in the form of a tubular flexible sleeve 10 (shown in part in broken lines) and a connector 12 for connecting the first elongate flexible structure 4 to a support structure such as a monopile for a wind turbine or within a bellmouth of a J-tube. The elongate flexible sleeve 10 is secured to the connector 12 by a geometric interlocking arrangement between an end of the elongate flexible sleeve 10 and a groove 12a provided at one end of the connector, as illustrated in FIG. 10. Alternatively, or in addition, the sleeve 10 may be secured to the connector 12 by bonding, clamping and/or other suitable means. In the embodiment shown, the connector 12 is a type of connector which is commonly referred to as an end fitting. The elongate flexible sleeve 10 and the connector 12 form a Cable Protection System (CPS) which is typically used during the installation of subsea power cables in order to protect a cable within the sleeve 10 from damage during the installation process and subsequent operation.

The connector 12 comprises a hollow cylindrical connector body 14 having first and second halves 14a, 14b (only the first half 14a is shown in FIG. 1) which, when assembled, are held together by straps 16a, 16b, 16c located in respective circumferentially extending external grooves 18a, 18b, 18c in the connector body 14.

A cylindrical bore 19 extends along the longitudinal axis of the connector body 14. The bore provides an inner surface 20 of the connector body 14. The inner surface 20 has a recess in the form of a first annular groove 22 extending around the longitudinal axis of the connector body 14. The first annular groove 22 has a V-shaped cross section when viewed in the circumferential direction. The annular groove 22 has a front surface 22a which is inclined from the apex of the groove 22 in a direction which is radially inward and forward with respect to the longitudinal axis of the connector body 14. The annular groove 22 has a rear surface 22b which is inclined from the apex of the groove 22 in a direction which is radially inward and rearward with respect to the longitudinal axis of the connector body 14. The connector body 14 has a conical front portion 23 which tapers in the forward direction along the longitudinal axis of the connector body 14. The front portion 23 has a conical abutment surface 23a which is configured to engage with a connector mounted on a subsea structure, as described with reference to FIGS. 8 and 9 below.

The second elongate flexible structure 6 comprises a cable 24 such as a subsea power cable. Typically, subsea power cables are used to transfer power from an offshore electrical power generator such as a wind turbine to a base station or to provide interconnection between wind turbines forming part of an array of wind turbines. A subsea power cable typically comprises several conductors, each of which is surrounded a conductor screen. The conductors are bundled together with fillers and communication cables, where appropriate, and the bundle is surrounded by one or more layers of armour (typically steel armour wires), tape or bituminous compound which provide protection. A subsea power cable typically has an overall diameter of between 50 mm and 300 mm.

The pull-in head assembly 8 comprises a pull-in head 26 and a pulling line 28.

Figure 4:
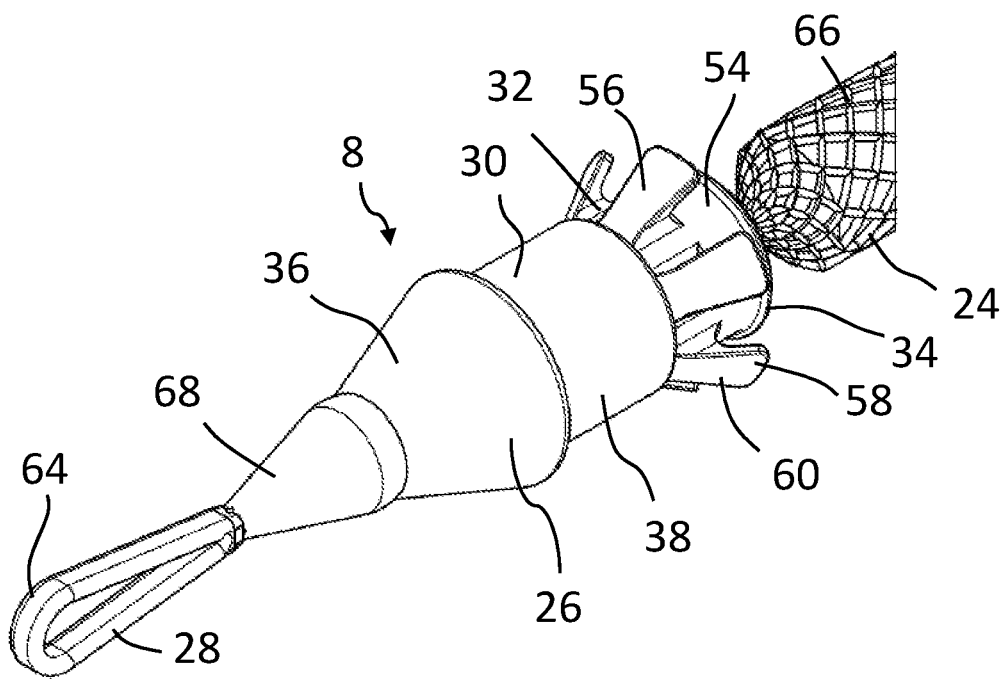
FIG. 4 is a perspective view of some of the components of the apparatus shown in FIG. 1.
Figure 5:
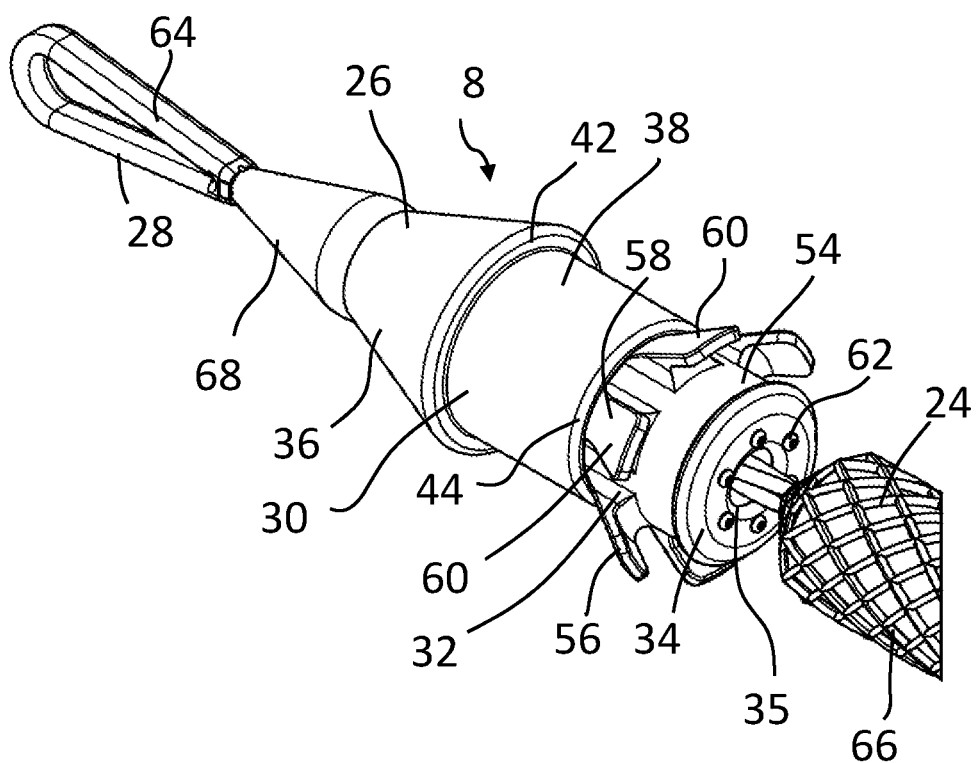
FIG. 5 is a perspective view of the components shown in FIG. 4 from a different perspective.

With reference to FIGS. 3 to 5, the pull-in head 26 comprises a body 30, a retaining member 32 and a securing plate 34. The body 30 has a front portion 36, a middle portion 38 and a rear portion 40. The body 30 has a longitudinal axis which defines a pulling axis X of the pull-in head 26. The front portion 36 has a conical outer profile which tapers in the forward direction along the pulling axis. The diameter of the front portion 36 is slightly greater than the diameter of the portion of the conical front portion 23 against which it abuts such that the front portion 36 overhangs slightly—which reduces the risk of snagging of the conical front portion 23 during installation. The middle portion 38 has a cylindrical profile. The diameter of the front portion 36 at the interface with the middle portion 38 is larger than the diameter of the middle portion 38 such that the front portion 36 defines a first annular abutment face 42 which abuts against the connector body 14, as shown in FIG. 3. The rear portion 40 also has a cylindrical profile. The diameter of the rear portion 40 is smaller than the diameter of the middle portion 38 such that middle portion 38 defines a second annular abutment face 44 against which the retaining member 32 located. The rear portion 40 has a recess in the form of a second annular groove 46 extending around the pulling axis X.

A bore 48 extends along the whole length of the body 30. The bore 48 is coaxial with the pulling axis X and defines an opening at each end of the bore 48. The bore 48 has divergent portions 50, 52 and the front and rear of the bore 48 respectively which are configured to reduce the likelihood of binding with the pulling line 28, as explained later.

The retaining member 32 is annular and extends circumferentially around the pulling axis X. The retaining member 32 comprises an inner cylindrical portion 54, through which the rear portion 40 of the body 30 extends, and an outer conical portion 56. In the present embodiment, the inner cylindrical portion 54 and the outer conical portion 56 are formed from a single piece of resilient material such as a polymeric material, for example rubber and/or polyurethane having a shore hardness between Shore 60A and Shore 60D. The outer conical portion 56 comprises six individual retaining elements 58, in the form of fingers, which are arranged circumferentially around the pulling axis X. Each retaining element 58 extends radially outwardly from the inner cylindrical portion 54 with respect to the pulling axis X and rearwardly with respect to the body 30. In the present embodiment, each retaining element 58 extends at an angle of 30 degrees with respect to the pulling axis X. In other embodiments, the angle can be set according to requirements but is preferred to be between 20 degrees and 70 degrees, such as not less than 30 degrees and not more than 50 degrees, in order to provide reliable release under a predetermined loading, as described later. The individual retaining elements 58 are shown most clearly in FIGS. 4 and 5. Each element 58 has an outer surface 60 which is curved to match the profile of the front surface 22a of the groove 22 against which it abuts. Consequently, the retaining member 32 is free to rotate within the groove 22 with respect to the connector body 14. Each element 58 is configured such that it flexes and compresses radially inwardly towards the pulling axis X when the pull-in head 26 is pressed with sufficient force against the front surface 22a of the connector body 14.

The retaining member 32 is held in abutting engagement with the second abutment face 44 by the securing plate 34. The securing plate 34 comprises a circular disc which is fastened to the rear of the body 30 by bolts 62 (see FIG. 5)

or other suitable fastening means. The securing plate 34 has a central aperture 35 which is aligned with the bore 48.

The pulling line 28 comprises a connecting loop 64 at one end for connecting the pull-in head assembly 8 to a winching cable or other pulling arrangement, a fastener 66 at the other end for fastening the pull-in head assembly 8 to the cable 24, and a stopper 68 which is disposed between the connecting loop 64 and the fastener 66.

In the embodiment shown, the pulling line 28 is woven from filaments made of a soft flexible material having a high tensile strength such as Kevlar™. The pulling line 28 may comprise, as an alternative or in addition, galvanised or stainless steel. The fastener 66 comprises a meshed tubular element which fits over the end of the cable 24. The fastener 66 is configured to form a cable grip into which an end of the cable 24 can be inserted. The filaments which form the fastener portion of the pulling line 28 are woven in a configuration in which the fastener 66 contracts around the cable 24 when a tension is applied to the pulling line. The arrangement is known in the art of cable installation as a pulling stocking, a cable grip, a cable stocking or a Chinese finger.

The portion of the fastener 66 which is not used to grip the cable 24 extends through the bore 48 which itself extends along the body 30 of the pull-in head 26 and the central aperture 35 of the securing plate 34. The stopper 68 is formed by weaving the filaments into a bulbous formation which has a maximum width that is greater than the opening at the front end of the bore 48. The stopper 68 may be formed by weaving the filaments around a rigid structure such as a bead or bobbin-like element.

The connecting loop 64 is formed by a fold of the filaments back on themselves and weaving the ends of the filaments together in the portion of the pulling line 28 between the connecting loop 64 and the end of the fastener 66. In the embodiment shown, the connecting loop 64 is adjacent the stopper 68. In alternative embodiments, the connecting loop 64 may be spaced away from the stopper 68 by up to 1 m or up to 5 m or up to 10 m or more.

In order to assemble the apparatus, the pull-in head assembly 8 may be first assembled by threading the end of the pulling line 28 having the fastener 66 through the bore 48 of the body 30 of the pull-in head 26 such that the fastener 66 extends from the rear of the pull-in head 26 and the connecting loop 64 and the stopper 68 are at the front of the pull-in head 26.

An end of the cable 24 is then inserted into the fastener 66. During the insertion, no tension is applied to the pulling line 28 so that the end of the cable 24 can slide easily into the fastener 66. The fastener 66 may even be compressed slightly in the longitudinal direction in order to expand the fastener 66 in order to receive the end of the cable 24 more easily. Once inserted, the fastener 66 can be released or a slight tension applied in order to contract the fastener 66 around the end of the cable 24 to grip the cable 24.

In this configuration, the pull-in head 26 is retained on the pulling line 28 by the stopper 68 and the cable 24/fastener 66.

Once the pull-in head assembly 8 has been secured to the cable 24 as described above, the body 30 of the pull-in head 26 is placed within the first half 14a of the connector body 14 such that the outer conical portion 56 of the retaining member 32 is located within the first annular groove 22 formed on the inner surface 19 of the connector body 14, as shown in FIG. 1. The pulling axis X is coaxial with the longitudinal axis of the connector 12. The second half 14b of the connector body 14 is then placed over the first half 14a and the two halves 14a, 14b are clamped together by the straps 16a, 16b, 16c.

Once assembled, the pull-in head 26 is prevented from moving axially along the pulling axis with respect to the connector 12 by the first annular abutment face 42, which abuts against the front of the connector 12, and the retaining member 32. When a pulling force is applied along the pulling line 28, the cable 24 is drawn forward into abutting engagement with the securing plate 34 (it will be appreciated that a portion of the fastener 66 will be sandwiched between the end of the cable 24 and the securing plate 34, but is prevented from binding against the body 30 by the divergent portion 52 of the bore 48). The force exerted by the cable 24 on the securing plate 34 is transmitted through the retaining member 32 to the connector body 14. Consequently, the connector 12 and the sleeve 10 forming the Cable Protection System are drawn along with the pull-in head 26 when the pull-in head is pulled in a direction along the pulling axis X. The pull-in head 26 is, however, rotatable about the pulling axis X with respect to the connector 12.

As explained above, the retaining member 32 is formed from a single piece of resiliently deformable material. The retaining elements 58 will therefore deflect radially inwardly when the retaining elements 58 are pressed against the front surface 22a of the groove 22 in the connector body 14 with sufficient force. The retaining member 32 is configured such that retaining elements 58 will deform radially inwardly by an amount which allows the pull-in head 26 to be pulled out of the end of the connector 12 only when a pulling force exceeding a predetermined threshold is applied. The predetermined threshold is determined based on the desired application for the pull-in head assembly 8. The retaining member 32 can be configured to release at a predetermined pulling force along the pulling axis X (defined as a release force of the pull-in head assembly 8) by selecting the number and/or thickness of the retaining elements, material type, material thickness, length of the retaining elements. For example, the release force may be set by selection of a suitable number of retaining elements. The release force may also be set by selection of a suitable thickness of one or more of the retaining elements. The release force may also be set by selection of a suitable angle at which the or each, or at least one, retaining element extends. For example, the actual angle will be dependent on the specific application and may be set based on one or more factors including cable diameter, Cable Protection System outer diameter, expected tension in the cable/winching cable during installation, desired release force (and corresponding tension in the cable/winching cable) and stiffness of the apparatus. The factors used to set the release force may be determined by onshore testing prior to offshore installation.

The release force may also be set by varying the coefficient of friction between the contact faces of the retaining member 32 and the front surface 22a of the groove 22 of the connector body 14. The coefficient of friction may be varied by providing a specific surface finish on one or both surfaces and/or by application of a lubricant between the surfaces. The type of fit between the retaining member 32 and the connector body 14 can be selected in accordance with a desired release force. The type of fit may be one of a clearance fit, an interference fit and a transition fit. In addition, a material of the retaining member can be selected having a desired bulk modulus.

Once assembled as described above, the apparatus 2 is ready for connection to a winching cable.

Figure 6:
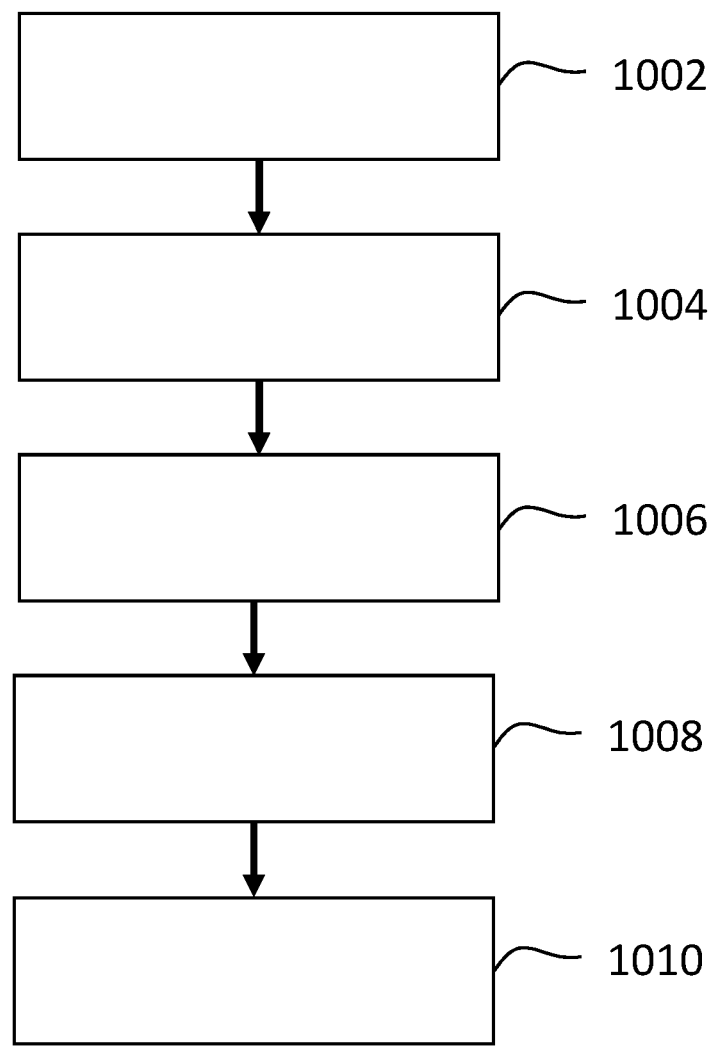
FIG. 6 is a flow chart illustrating steps of an installation process.

FIG. 6 is a flow chart illustrating a method of connecting the apparatus 2 to a monopile for a wind turbine.

FIG. 7A is a schematic representation of an apparatus 2 at step 1002 during installation.

The monopile 102 is located on the sea bed 104. The monopile 102 comprises a tubular body 105 which extends vertically and has a circular aperture 106 near to the base of the monopile 102 for receiving a power cable into the monopile 102. The aperture 106 is located in a region of the monopile 102 which is submerged when the monopile 102 is located on the sea bed 104. A monopile connector 108 is provided at the aperture 106 for connecting to a Cable Protection System as described below. The monopile 102 has a hang-off point 110 within the monopile 102 to which a cable arrangement can be connected.

Prior to installation, a winching cable 112 (typically known in the art as a messenger line) is threaded downwardly through the body 105 of the monopile from a winch (not shown) past (or through) the hang-off point 110 and through the aperture 106 out of the monopile 102. The end of the winching cable 112 is provided with a fastener 114 such as a clasp which is connected to the connecting loop 64 of the pull-in head assembly 8.

Initially, the apparatus 2, which comprises the sleeve 10 and connector 12, the cable 24 and the pull-in head assembly 8 as described above, may be spooled on a vessel such as a boat.

Once the winching cable 112 has been secured to the connecting the loop 64, the winch is activated to pull the pull-in head assembly 8 from the transport vessel downwardly towards the base of the monopile 102. As the pull-in head assembly 8 travels downwardly, the connector 12 is pulled downwards with the pull-in head assembly 8, as shown in FIG. 7A, such that the sleeve 10 and the cable 24 unspool from the transport vessel.

As the pull-in head assembly 8 travels downwardly, the weight of the sleeve 10, cable 24, connector 12 and the pull-in head 26 (which is free to slide along the portion of the pulling line 28 between the stopper 68 and the end of the cable 24) causes the connector 12 to push down against the stopper 68. The stopper 68 therefore prevents the pull-in head 26 and the connector 12 from sliding downwardly away from the end of the cable 24.

As the sleeve 10 unspools, a torque is generated by the sleeve 10 about the longitudinal axis of the sleeve 10 and hence the pulling axis X. The torque is a consequence of the residual stresses within the sleeve 10 that are introduced during manufacture or by the winding of the sleeve 10 onto the spool. This torque is transferred to the connector 12. Since the connector 12 is free to rotate with respect to the pull-in head 26 (as described above), the pull-in head assembly 8 significantly reduces, and may eliminate entirely, the transfer of torque from the sleeve 10 to the winching cable 112. It will be appreciated that the pull-in head 26 is also free to rotate with respect to the pulling line 28, which can also help to alleviate torque transfer.

In the embodiment shown in FIG. 7A, the distance between connecting loop 64 and the stopper 68 is 1 m (the arrangement is therefore different in this respect from the embodiment shown in FIGS. 1 to 5 in which the connecting loop 64 is shown adjacent the stopper 68). The distance between the connecting loop 64 and the stopper 68 ensures that the fastener 114 and the connecting loop 64 are drawn through the aperture 106 while the pull-in head assembly 8 is travelling downwardly. In this orientation, the weight of the apparatus 2 is against the stopper 68 (or else is supported by the surrounding water) and so the tension acting on the winching cable 112 is relatively low. Consequently, the risk of snagging of the fastener 114 and/or the connecting loop 64 as they pass through the aperture 106 is minimised. The divergent portion 50 of the bore 48 accommodates the stopper 68 and helps prevent binding of the stopper 68 against the body 30.

FIG. 7B shows installation of the apparatus 2 at step 1004 as the pull-in head assembly 8 draws level with the aperture 106. At step 1004, the fastener 114 and the connecting loop 64 have passed through the aperture 106 following which the risk of snagging is reduced.

FIG. 7C shows installation of the apparatus 2 at step 1006 as the pull-in head assembly 8 is adjacent the aperture 106. At step 1006, the front portion 36 of the body 30 slides through the aperture 106 while the pull-in head assembly 8 is horizontal. The conical outer profile of the front portion 36 of the body 30 and the conical abutment surface 23a of the connector body 14 allow the pull-in head 26 and the connector 12 to slide over the edge of the aperture 106 which minimises the risk of snagging as the apparatus 2 is drawn through the aperture 106. Furthermore, the weight of the apparatus 2 still does not contribute significantly to the tension on the winching cable 122. The risk of snagging therefore remains low.

FIG. 7D shows installation of the apparatus 2 at step 1008 as the connector 12 is brought into engagement with the monopile connector 108. The transition from step 1008 to step 1010, shown in FIG. 7E, in which the pull-in head 26 has been separated from the connector 12 will be described with reference to FIGS. 8 and 9.

FIG. 8 shows the monopile connector 108 having an aperture 116 through which the pull-in head assembly 8 is drawn by the winching cable 112.

An annular abutment surface 118 surrounds the aperture 116. The annular abutment surface 118 is arranged to receive the front portion 23 of the connector body 14. In order to ensure that the connector 12 is correctly aligned with the monopile connector 108, the annular abutment surface 118 is conical and has a profile that corresponds to the profile of the conical abutment surface 23a of the front portion 36 of the connector body 14. Thus, as the front portion 36 of the pull-in head 26 is drawn through the aperture 116, the conical abutment surface 23a of the connector body 14 and the annular abutment surface 118 of the monopile connector 108 are brought into contact and slide over each other to align the connector 12 with the monopile connector 108. Once the connector 12 has been engaged completely with the monopile connector 108 (in this instance, complete engagement is when the connector 12 and the monopile connector 108 are coaxially aligned and the conical abutment surface 23a and the annular abutment surface 118 are contiguous, as shown in FIG. 8) a latching mechanism (not shown) is used to secure the connector 12 into engagement with the monopile connector 108. The latching mechanism may be manual or automatic.

Throughout steps 1002 to 1008, the pulling force exerted on the pull-in head 26 along the pulling axis X is not expected to exceed a predetermined threshold. For example, the drag force, friction force and other forces (which are invariably present when pulling a cable and a Cable Protection System from a spool) can be expected, in the absence of snagging events, to be below a threshold force. The threshold force will be dependent on many factors including, but not limited to, the length of the cable unspooled, the length of the Cable Protection System unspooled, the dimensions (such as a cable diameter or a width) of the cable and the Cable Protection System, the force required to trigger a latching mechanism of the monopile connector (or other connector) and other factors. Nevertheless, a threshold force that can be expected to be not exceeded during an installation process can be determined, for example, using empirical data or modelling.

In the present embodiment, the force exerted on the pull-in head 26 along the pulling axis X is not expected to exceed 60 kN throughout steps 1002 to 1008.

Once the connector 12 has engaged with the monopile connector 108 completely, the monopile connector 108 prevents further advancement of the connector 108. Consequently, an increase in the pulling force exerted by the winch along the winching cable 112 translates into an increase in the force exerted on the pull-in head 26 along the pulling axis X. When the pulling force exerted on the pull-in head 26 along the pulling axis X exceeds a predetermined amount, which is set at or above the threshold force, for example at a force between 15 kN and 150 kN, for example at a force between 80 kN and 120 kN, such as 100 kN for the embodiment shown, the force exerted by the front surface 22a of the groove 22 in the connector body 14 on the individual retaining elements 58 cause the retaining elements 58 to deflect radially inwardly and/or compress, allowing the pull-in head 26 to move out of the connector 12, as shown in FIG. 9. Deflection of the retaining elements 58 inwardly is aided by deflection of the inner cylindrical portion 54 into the second annular groove 46. It will also be appreciated that the spacing between adjacent retaining elements 58 allows the retaining elements to collapse into the voids between the adjacent retaining elements 58 without obstructing each other.

It will be appreciated that variation in manufacturing tolerances, temperature, environmental factors and other factors may contribute to fluctuations in the actual pulling force that is required to release the pulling head assembly. Such factors may be taken into consideration by configuring the pulling head assembly such that the release force will not fluctuate outside a predetermined range. For example, the release force will not fall below 80 kN under normal operation and will not exceed 120 kN during normal operation. The term predetermined release force should therefore be understood as a release force which could be expected under predetermined conditions.

As the retaining member 32 moves from the groove 22 through the end of the connector 12, the retaining elements 58 are compressed, as described above, into a release configuration in which the outer surfaces 60 of the respective retaining elements 58 define a substantially cylindrical outer profile having a diameter which corresponds to the internal diameter of the bore 19 through the connector body 14. The pull-in head 26 can therefore be separated from the connector 12 along the pulling axis X and pulled upwardly through the monopile 102 in accordance with step 1010 as shown in FIG. 7E.

The retaining member 32 provides a mechanical fuse which causes the pull-in head assembly 8 to release from the connector 12 when a pulling force along the pulling axis X exceeds a predetermined threshold. This ensures that release of the pull-in head assembly 8 is predictable and reliable and occurs only when the connector 12 has been connected to the monopile connector 108. Furthermore, the arrangement on the retaining elements 58 about the pulling axis X ensures that a pulling force exerted along the pulling axis X which is transmitted from the pulling head to the connector 12 is distributed around the pulling axis X. Consequently, force required to release the pull-in head assembly 8 from the connector 8 is independent of the orientation of the pull-in head 26 with respect to the connector 12 and the orientation of the connector 12 with respect to the monopile connector 108 with which it engages.

Once the pull-in head 26 has separated from the connector 12, the end of the cable 24 which remains attached to the pull-in head 26 slides out from the sleeve 10 and the connector 12 and is pulled with the pull-in head 26 to the hang-off point 110 within the monopile 102.

It will be appreciated that once the pull-in head 26 has transferred from the configuration shown in FIG. 8 to the configuration shown in FIG. 9, the pulling force exerted along the pulling axis X may reduce since the retaining member 32 has escaped the groove 22 and may further reduced as the pull-in head 26 exits the connector 12. Consequently, the transition from the configuration shown in FIG. 8 to the configuration shown in FIG. 9 may be identified by a spike in the pulling force applied to the pull-in head 26.

Although in the embodiment described above the retaining member is formed as an integrated component comprising a single piece of material, it will be appreciated that the inner cylindrical portion and the outer conical portion may be separate components. The retaining elements may also be separate components from each other. The retaining member and the body of the pulling head may be separate components, as shown in the described embodiments, but may be a single integrated component. The retaining member and the body may be made of the same or different materials.

An alternative embodiment may comprise a connector having at least two annular grooves provided in the inner surface defining the bore of the connector, wherein the grooves are arranged adjacent each other or spaced apart along the longitudinal axis of the connector. Such an arrangement is particularly suitable for applications in which radial space is restricted, for example, arrangements in which the diameter of a cable is large relative to the diameter of the cable protection system.

A further embodiment may comprise a rigid retaining member which engages with a resilient portion of the connector, wherein the resilient portion of the connector is configured to deform in order to release the pulling head assembly.

In the embodiment shown, the monopile connector has an annular abutment surface into which the connector is brought into engagement. It will, however, be appreciated that other means for limiting motion of the connector could be utilised. For example, the connector could be provided with an abutment feature, such as a shoulder, at its outer surface which contacts an outer surface of the monopile, or other support structure, surrounding the aperture in order to limit further forward motion.

Further embodiments may comprise a retaining member which is configured to break or plastically deform when the pulling force exerted along the pulling axis exceeds a predetermined threshold.

FIG. 11 shows a variation of the apparatus shown in FIG. 1 in which a pull-in head assembly 108 comprises a body 130 and a retaining member 132 in the form of an annular collar 133 which extends about the pulling axis X. The annular collar 133 is arranged to engage both the body 130 and a connector 112 of a tubular elongate flexible structure 104 such that the pull-in head assembly 108 is secured to the connector 112 in the direction of the pulling axis X. In particular, the annular collar 133 is located in respective opposing grooves provided in the body 130 and an inner surface of a central bore 119 that extends along the connector 112.

A mid portion 133a of the annular collar 133 which extends circumferentially between the inner radial periphery and the outer radial periphery of the annular collar 133 is configured to yield and/or fracture when a pulling force exceeding a predetermined threshold is exerted on the pull-in head assembly 108 along the pulling axis. For example, the mid portion 133a may comprise a frangible portion which fractures under a shear stress when a force exceeding a predetermined threshold is exerted parallel to the pulling axis X. The mid portion 133a is aligned radially with an interface of an outer surface of the body 130 and an inner surface of the bore 133a. The mid portion 133a divides the annular collar 133 into an inner portion 133b and an outer portion 133c.

During use, when the connector 112 is installed (using a method corresponding to the method described previously) and the pulling force exerted along the pulling axis X exceeds the predetermined threshold, the annular collar 133 breaks along the mid portion 133a. The inner portion 133b is then drawn with the body 130 from the connector 112 as the pull-in head is separated from the connector 112. The outer portion 133c remains within the connector 112 or else is removed separately.

In an alternative embodiment, the annular collar 133 may comprise a plurality of fingers (similar to the retaining elements of the embodiment shown in FIGS. 4 and 5) which shear off when the pulling force exceeds a predetermined threshold. The fingers may be arranged to extend rearwardly at an angle of between 70 degrees and 90 degrees with respect to the pulling axis.

In the drawings like reference numerals refer to like parts.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A pull-in head assembly for releasably connecting a pulling arrangement to an elongate flexible structure, comprising:

a body which defines a pulling axis of the pull-in head assembly; and a retaining member which is configured to secure the pull-in head assembly to an elongate flexible structure such that a pulling force exerted on the body along the pulling axis is transferred to the elongate flexible structure, wherein the pull-in head assembly is configured such that, in use, the body and the elongate flexible structure are rotatable with respect to each other about the pulling axis, and wherein the retaining member has at least one retaining feature which is configured to engage with a corresponding retaining groove provided on the elongate flexible structure such that the retaining feature can slide within the groove, and wherein the retaining member is free to rotate within the groove.

2. The pull-in head assembly of claim 1, wherein the retaining member is annular.

3. The pull-in head assembly of claim 1, wherein the retaining member has a substantially conical outer profile.

4. The pull-in head assembly of claim 3, wherein the retaining member converges towards a front of the pull-in head assembly along the pulling axis.

5. The pull-in head assembly of claim 1, wherein at least a portion of the pull-in head assembly comprising the retaining member is configured for insertion into an open end of the elongate flexible structure.

6. The pull-in head assembly of claim 5, wherein the portion of the pull-in head assembly comprising the retaining member is configured for insertion into an end of a connector for a cable protection system.

7. The pull-in head assembly of claim 1, wherein the retaining member is configured to releasably secure the pull-in head assembly to the elongate flexible structure.

8. The pull-in head assembly of claim 1, wherein the pull-in head assembly is configured such that the elongate flexible structure rotates with respect to the body about the pulling axis when a torque within a predetermined range is applied to the elongate flexible structure.

9. The pull-in head assembly of claim 8, wherein the retaining member has a bearing surface which engages with the elongate flexible structure, wherein the bearing surface has a coefficient of friction which is less than 2.

10. Apparatus comprising:
a pull-in head assembly in accordance with claim 1; and
an elongate flexible structure comprising an elongate flexible element and a connector for connecting the elongate flexible element to a support structure, wherein the pull-in head assembly is secured to the connector.

11. The apparatus of claim 10, wherein the connector comprises a retaining feature which is configured to engage the retaining member in order to secure the pull-in head assembly to the elongate flexible structure.

12. The apparatus of claim 11, wherein the connector has a bore which extends along a longitudinal axis of the connector for receiving at least a portion of the pull-in head assembly comprising the retaining member.

13. The apparatus of claim 12, wherein the retaining feature comprises at least one annular groove provided in a surface of the bore.

14. The apparatus of claim 13, wherein the annular groove has a profile which corresponds to an outer profile of the retaining member such that the retaining member engages with the annular groove to secure the pull-in head assembly to the elongate flexible structure.

15. The apparatus of claim 14, wherein the annular groove has a V-shaped profile when viewed in a circumferential direction.

16. The apparatus of claim 10, wherein the retaining member is configured to releasably secure the pull-in head assembly to the elongate flexible structure.

17. The apparatus of claim 16, further comprising a second elongate flexible structure which extends within the elongate flexible structure, wherein the second elongate flexible structure is secured to the body such that, following release of the pull-in head assembly from the elongate flexible structure, the second elongate flexible structure remains connected to the pull-in head assembly as the pull-in head assembly is separated from the elongate flexible structure.

18. A method of installing an elongate flexible structure comprising the steps:
- providing a pull-in head assembly in accordance with claim 1;
- securing the pull-in head assembly to an elongate flexible structure; and
- pulling the pull-in head assembly together with the elongate flexible structure into a desired location.

* * * * *